United States Patent
Catreux et al.

(10) Patent No.: US 6,802,035 B2
(45) Date of Patent: *Oct. 5, 2004

(54) SYSTEM AND METHOD OF DYNAMICALLY OPTIMIZING A TRANSMISSION MODE OF WIRELESSLY TRANSMITTED INFORMATION

(75) Inventors: Severine Catreux, San Jose, CA (US); David Gesbert, Oslo (NO); Manish Airy, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/072,359

(22) Filed: Apr. 1, 2002

(65) Prior Publication Data

US 2002/0147953 A1 Oct. 10, 2002

Related U.S. Application Data

(63) Continuation-in-part of application No. 09/665,149, filed on Sep. 19, 2000.

(51) Int. Cl.[7] .......................... G06F 11/00; H03M 13/00
(52) U.S. Cl. ....................... 714/746; 714/704; 714/774; 370/252; 370/345; 455/67.13; 455/102
(58) Field of Search ................................ 714/746, 704, 714/708, 748, 751, 776; 370/252, 345, 206; 375/259, 261, 267; 455/102

(56) References Cited

U.S. PATENT DOCUMENTS

| | | | | |
|---|---|---|---|---|
| 5,559,810 A | * | 9/1996 | Gilbert et al. ............... | 714/704 |
| 6,044,485 A | * | 3/2000 | Dent et al. ................... | 714/774 |
| 6,167,031 A | * | 12/2000 | Olofsson et al. ............ | 370/252 |
| 6,175,550 B1 | * | 1/2001 | Van Nee ...................... | 370/206 |

* cited by examiner

Primary Examiner—Emmanuel L. Moise
(74) Attorney, Agent, or Firm—Michael A. Proksch

(57) ABSTRACT

The present invention includes a method of optimizing a transmission mode of wirelessly transmitted data. The method includes selecting a first transmission mode based on a predetermined channel database and a first channel characterization. The first channel characterization can be based upon signals transmitted in an initial mode. An error factor is generated based on a difference between an estimated performance characteristic, and an expected performance characteristic. A subsequent transmission mode is selected based upon the predetermined channel database, the error factor and a subsequent channel characterization. The predetermined channel database can include a predetermined look-up-table that provides transmission mode selections based upon the channel characterizations. The look-up-table generally includes a plurality of quality parameter thresholds that determine the selection of a transmission mode. Another method includes receiving transmission signals that include data encoded in an initial transmission mode. A first quality parameter of the received transmission signals is measured. A subsequent transmission mode is selected based upon the quality parameter. Transmission signals are received having data encoded in the subsequent transmission mode. A second quality parameter is measured. A parameter is adjusted within selection criteria of another subsequent transmission mode based upon the second quality parameter.

39 Claims, 7 Drawing Sheets

410 {

| MODE | THRESHOLD (db) |
|---|---|
| 1 | 5 |
| 2 | 7.5 |
| ⋮ n ⋮ m | ⋮ 12 ⋮ 15 |

420

TARGET BER = X

| MODE | THRESHOLD (db) |
|---|---|
| 1 | 3 |
| 2 | 5.5 |
| ⋮ n ⋮ m | ⋮ 10 ⋮ 13 |

430

TARGET BER = Y

FIGURE 4

SYSTEM AND METHOD OF DYNAMICALLY OPTIMIZING A TRANSMISSION MODE OF WIRELESSLY TRANSMITTED INFORMATION

RELATED APPLICATIONS

This application is a continuation-in-part to application Ser. No. 09/665,149 filed on Sep. 19, 2000.

FIELD OF THE INVENTION

The invention relates generally to wireless communications between a base station and multiple users. More particularly, the invention relates to a system and method for dynamically optimizing a transmission mode of wirelessly transmitted information.

BACKGROUND OF THE INVENTION

Wireless communication systems commonly include information carrying modulated carrier signals that are wirelessly transmitted from a transmission source to one or more receivers within an area or region.

Wireless communication systems serving stationary and mobile wireless subscribers are rapidly gaining popularity, resulting in a need for greater efficiency in the use of the available radio frequency spectrum. This goal is complicated because wireless communications channels between transmit and receive devices are inherently variable, so the characteristics of wireless channels, such as signal quality, generally vary in time, frequency and space. Under good conditions wireless channels exhibit good communication parameters, e.g., large data capacity, high signal quality, high spectral efficiency and throughput. However, under poor channel conditions, these parameters have significantly lower values. For example, when the wireless channel is degraded the transmitted data may experience excessive corruption, manifesting as high bit-error rates or packet error rates. The degradation of the channel can be due to a multitude of factors such as general noise in the channel, multipath fading, loss of line-of-sight path, excessive Co-Channel Interference (CCI) and other factors.

Motivated by these complications, prior art wireless systems have employed adaptive modulation of the transmitted signals with the use of feedback from the receiver as well as adaptive coding and receiver feedback to adjust data transmission to changing channel conditions. Such adaptive modulation has been applied to Single Input Single Output (SISO) as well as to Multiple Input Multiple Output (MIMO) systems, e.g., systems with antenna arrays at both the transmit and receive ends.

In wireless systems (mobile and fixed), signal degradation and corruption is primarily due to interference from other cellular users within or near a given cell and multipath fading, in which the received amplitude and phase of a signal varies over time. In Fixed Wireless Access (FWA) systems, that is, where the receiver remains stationary, signal fading rate is less than in mobile systems. In this case, the channel coherence time or the time during which the channel estimate remains stable is longer since the receiver does not move.

Prior art wireless systems have employed adaptive modulation of the transmitted signals with the use of feedback from the receiver as well as adaptive coding and receiver feedback to adapt data transmission to changing channel conditions. Such adaptive modulation is applied to Single Input Single Output (SISO) systems. In both SISO and MIMO systems, however, the fundamental problem of efficient choice of the mode to be applied to the transmitted data remains.

It would be an advance to provide a mode selection technique which allows the system to rapidly and efficiently select the appropriate mode for encoding data in a quickly changing channel. It is important that such technique be efficient in all wireless systems, including Multiple Input Multiple Output (MIMO), Multiple Input Single Output (MISO), Single Input Single Output (SISO) and Single Input Multiple Output (SIMO) systems as well as systems using multiple carrier frequencies, for example, OFDM systems.

SUMMARY OF THE INVENTION

The invention includes an apparatus and a method for adaptively optimizing a transmission mode of data transmitted to users within a wireless cellular system. The apparatus and method are adaptable for use in MIMO systems.

A first embodiment of the invention includes a method of optimizing a transmission mode of wirelessly transmitted data. The method includes selecting a first transmission mode based on a predetermined channel database and a first channel characterization. The first channel characterization can be based upon signal transmission according to an initial mode. An error factor is generated based on a difference between an estimated performance characteristic, and an expected performance characteristic. A subsequent transmission mode is selected based upon the predetermined channel database, the error factor and a subsequent channel characterization.

A second embodiment is similar to the first embodiment. For this embodiment, the predetermined channel database includes a predetermined look-up-table that provides a transmission mode selection based upon a channel characterization. The look-up-table generally includes a plurality of quality parameter thresholds that determine the selection of a transmission mode.

The second embodiment can further include adjusting the quality parameter thresholds within the predetermined look-up-table with the error factor, and selecting the subsequent transmission mode based upon the adjusted look-up-table and the subsequent channel characterization.

The error factor can be generated once for every received data packet. One embodiment includes the error factor being set to a first value if a data packet is properly received, and the error factor being set to a second value if the data packet is improperly received.

The error factor can also be generated once per a predetermined amount of time. The error factor can be set to a first value if an average packet error ration is greater than an upper bound threshold, and the error factor can be set to a second value if the average packet error ration is less than an lower bound threshold.

Another embodiment includes the quality parameter thresholds within the predetermined look-up-table being adjusted by the error factor after the reception of each data packet. Another embodiment includes adjusting the subsequent channel characterization with the error factor, and selecting the subsequent transmission mode based upon the look-up-table and the adjusted subsequent channel characterization.

A third embodiment is similar to the first embodiment. The third embodiment includes spatial multiplexing. The third embodiment includes individually selecting an first transmission mode based on a predetermined channel database and a first channel characterization for each of a plurality of transmission streams. Each of the plurality of transmission streams are received by the same receiver, allowing spatial multiplexing. An error factor is generated based on a difference between an estimated performance characteristic, and an expected performance characteristic, of the plurality of transmission streams. A subsequent transmission mode is selected based upon the predetermined channel database, the error factor and a subsequent channel characterization, for the transmission streams. Another embodiment includes the transmission streams being transmitted from a plurality of base stations, providing multiple base station spatial multiplexing. For multiple base station spatial multiplexing, an error factor and a corresponding subsequent transmission mode can be generated for each of the transmission streams.

A fourth embodiment includes method of optimizing a transmission mode of wirelessly transmitted data. The method includes receiving transmission signals that include data encoded in an initial transmission mode. A first quality parameter of the received transmission signals is measured. A subsequent transmission mode is selected based upon the quality parameter. Transmission signals are received having data encoded in the subsequent transmission mode. A second quality parameter is measured. A parameter is adjusted within selection criteria of another subsequent transmission mode based upon the second quality parameter.

Selecting a subsequent transmission mode based upon the quality parameter can include referencing a predetermined look-up-table that provides a subsequent transmission mode selection based upon the first quality parameter. The look-up-table can include a plurality of quality parameter thresholds that determine the selection of a subsequent transmission mode.

Adjusting a parameter within a selection criteria of the subsequent transmission mode based upon the second quality parameter can include adjusting the quality parameter thresholds within the predetermined look-up-table.

Obtaining the second quality parameter can include incrementing a table correction factor to a first value of a data packet is properly received, and incrementing the table correction factor to a second value if the data packet is improperly received. The quality parameter thresholds within the predetermined look-up-table are adjusted by the table correction factor after the reception of each data packet.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a look up table according to an embodiment of the invention.

DETAILED DESCRIPTION

Figure 1:
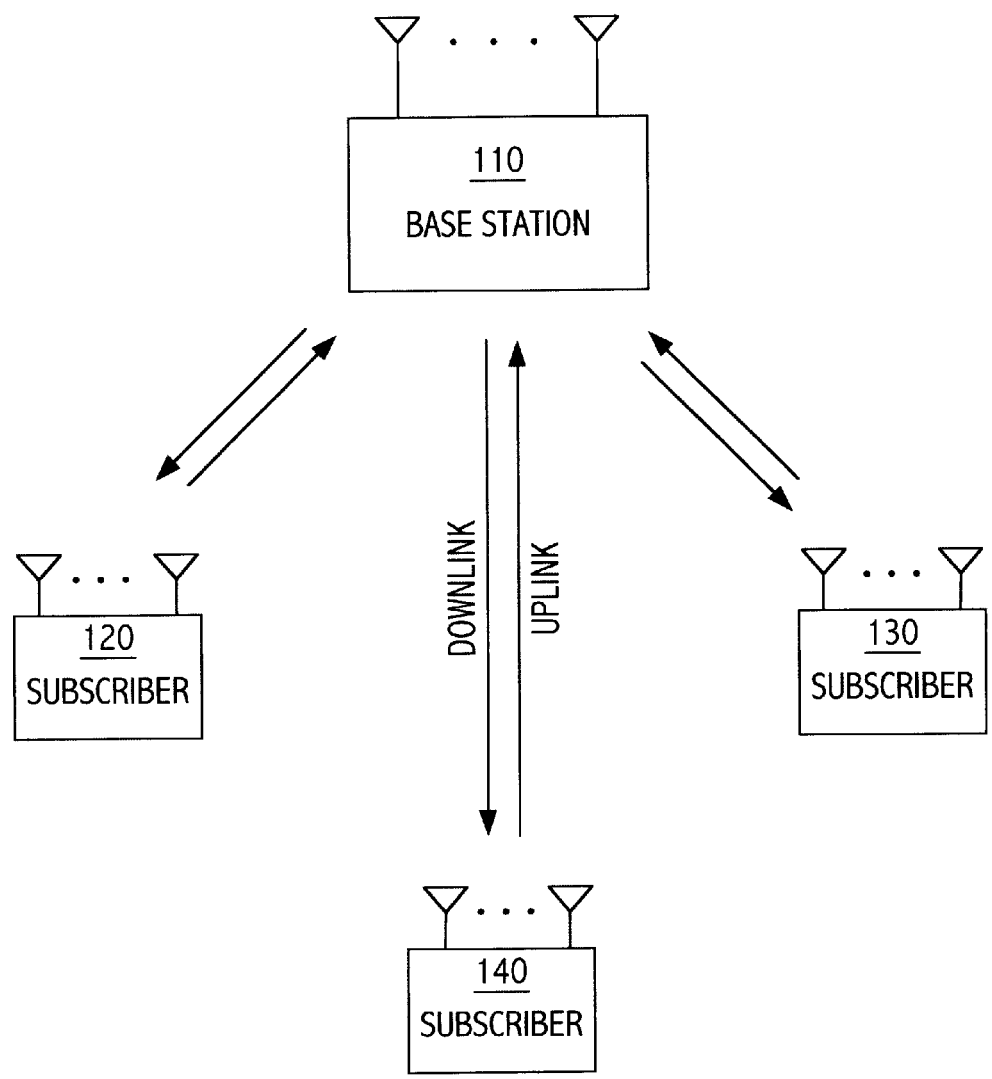
FIG. 1 shows a wireless communication system

As shown in the drawings for purposes of illustration, the invention is embodied in an apparatus and a method for adaptively selecting a transmission mode for the transmission of data to users within a wireless cellular system. The invention can include multiple antennae systems.

Particular embodiments of the present invention will now be described in detail with reference to the drawing figures. The techniques of the present invention may be implemented in various different types of wireless communication systems. Of particular relevance are cellular wireless communication systems, such as the system shown in FIG. 1. A base station 110 transmits downlink signals over wireless channels to multiple subscribers 120, 130, 140. In addition, the subscribers 120, 130, 140 transmit uplink signals over the wireless channels to the base station 110. Thus, for downlink communication the base station 110 is a transmitter and the subscribers 120, 130, 140 are receivers, while for uplink communication the base station 10 is a receiver and the subscribers 120, 130, 140 are transmitters. The subscribers 120, 130, 140 may be mobile or fixed. Exemplary subscribers include devices such as portable telephones, car phones, and stationary receivers such as a wireless modem at a fixed location.

The base station 110 can include multiple antennas that allow antenna diversity techniques and/or spatial multiplexing techniques. In addition, each subscriber can include multiple antennas that permit further spatial multiplexing and/or antenna diversity. Single antennas, however, may also be used. Thus, Single Input Single Output (SISO), Multiple Input Single Output (MISO), Single Input Multiple Output (SIMO), or Multiple Input Multiple Output (MIMO) configurations are all possible. In any of these configurations, the communications techniques can employ single-carrier or multi-carrier communications techniques.

Spatial multiplexing modes can be implemented using multiple antennas at a single base station, or through the use of multiple base stations each transmitting a portion of the multiple signals. Multiple base station spatial multiplexing will be discussed with greater detail later.

Although the techniques of the present invention apply to point-to-multipoint systems such as shown in FIG. 1, they are not limited to such systems, but apply to any wireless communication system having at least two devices in wireless communication. Accordingly, for simplicity, the following description will focus on the invention as applied to a single transmitter-receiver pair, even though it is understood that it applies to systems with any number of such pairs.

Typically, variations of the wireless channels cause uplink and downlink signals to experience fluctuating levels of attenuation, interference, multi-path fading and other deleterious effects. In addition, the presence of multiple signal paths (due to reflections off buildings and other obstacles in the propagation environment) causes variations of channel response over the frequency bandwidth, and these variations may change with time as well. As a result, there are temporal changes in channel communication parameters such as data capacity, spectral efficiency, throughput, and signal quality parameters, e.g., signal-to-interference and noise ratio (SINR), and signal-to-noise ratio (SNR).

Information is transmitted over the wireless channel using one of various possible transmission modes. For the purposes of the present application, a transmission mode is defined to be a particular modulation type and rate, a particular code type and rate, and may also include other controlled aspects of transmission such as the use of antenna diversity or spatial multiplexing. Using a particular transmission mode, data intended for communication over the wireless channel is coded, modulated, and transmitted. Examples of typical coding modes are convolution and block codes, and more particularly, codes known in the art such as Hamming Codes, Cyclic Codes and Reed-Solomon Codes. Examples of typical modulation modes are circular constellations such as BPSK, QPSK, and other m-ary PSK, square constellations such as 4QAM, 16QAM, and other m-ary QAM. Additional popular modulation techniques include GMSK and m-ary FSK. The implementation and use of these various transmission modes in communication systems is well known in the art.

In addition to the transmission mode, communication over the wireless channel uses one of several possible channelization modes. The channelization mode is related to the spectrum use in time and/or frequency for a particular subscriber. In general, any one of various known schemes may be used to divide the total spectrum in frequency and/or time, creating a set of time/frequency subchannels that may be allocated to different subscribers. Frequency division multiple access (FDMA) is a method of dividing the wireless spectrum that associates each communication channel with a different single-frequency carrier. Often the single frequency is further divided in time using time division multiple access (TDMA). In TDMA the frequency carrier is divided into successive time frames, each containing a set of time slots. A single subchannel in an FDMA/TDMA system is thus associated with both a specific carrier frequency and a particular time slot. Orthogonal frequency division multiplexing (OFDM) is a sophisticated method of FDMA/TDMA. In OFDM each subchannel is associated with a time slot and a set of multiple subcarriers (i.e., tones) multiplexed together, each subcarrier at a different frequency and each modulated by a signal which varies discretely rather than continuously. The set of subcarrier frequencies associated with each channel is chosen from a set of N subcarrier frequency tones available to the system. In any multiplexing scheme, channel assignment, or channel allocation is the process of assigning each subscriber to one or more time intervals and/or to one or more frequency carriers or subcarriers. Typically, channel allocation is a primary task performed by a media access controller (MAC) at a system base station.

A transmission mode for encoding data at transmit units (base station) 110 is selected based on a quality parameter and a correction factor. The details of the method will now be explained by referring to the operation of a transmit unit 200 as shown in FIG. 2 and a receive unit 300 as illustrated in FIG. 3.

Figure 2:
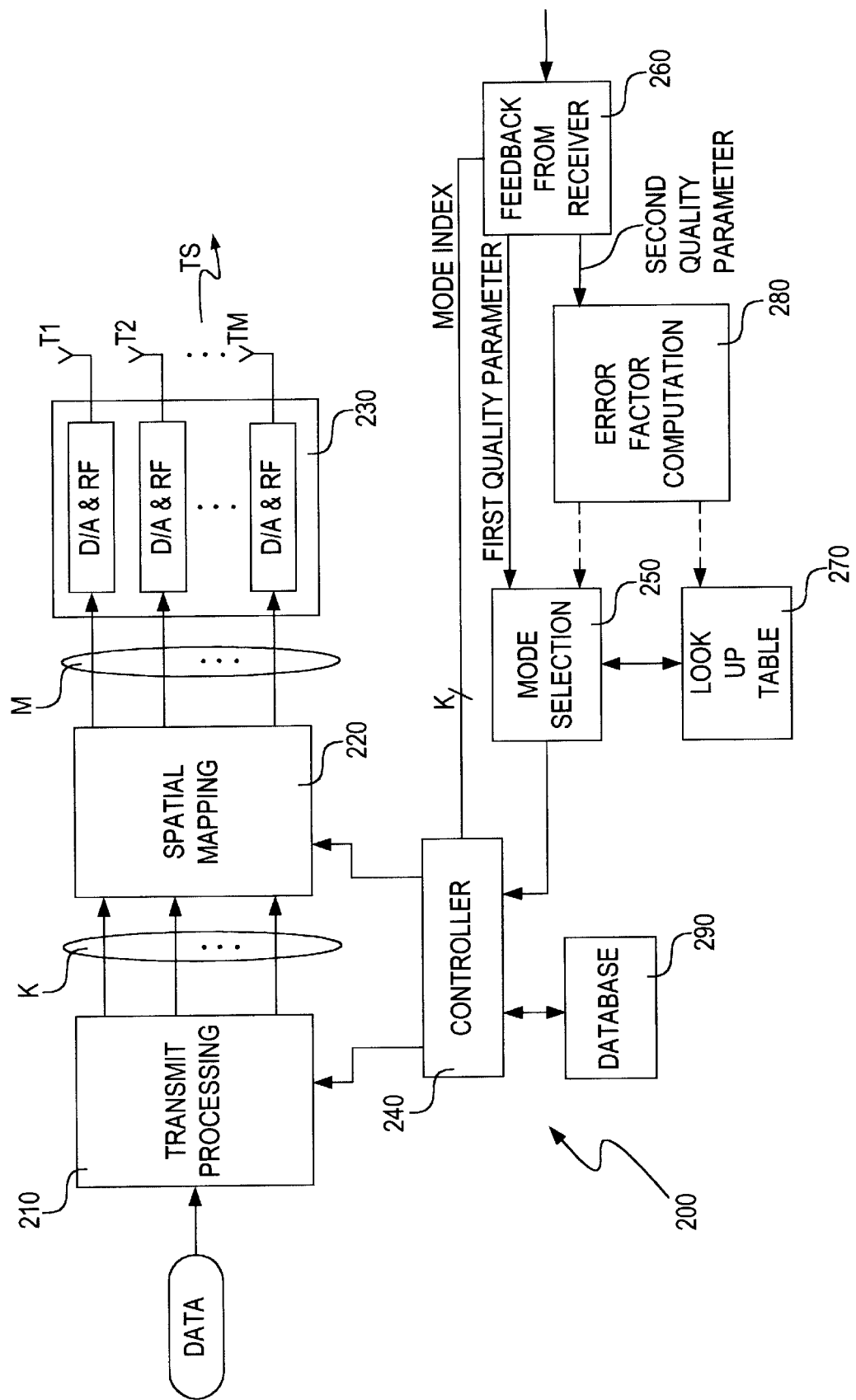
FIG. 2 is a block diagram of a system according to an embodiment of the invention.
Figure 3:
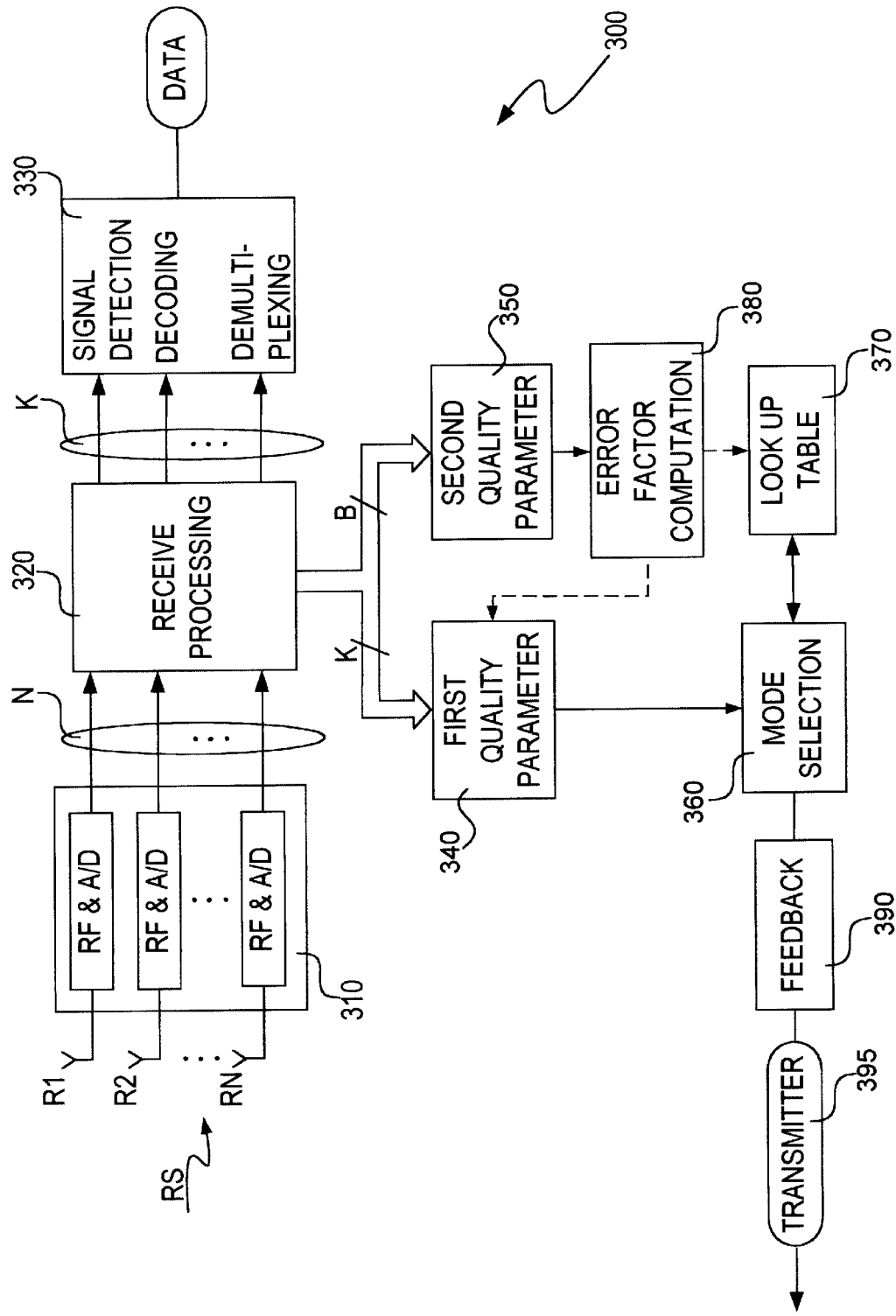
FIG. 3 is a block diagram of another system according to an embodiment of the invention.

As shown in FIG. 2, a transmit unit 200 receives data to be transmitted. Generally, the data is in the form of a stream of binary data. The data is delivered to a transmit processing block 210. The transmit processing block 210 subdivides the data into a number k of parallel streams. Then, the transmit processing block applies an encoding mode to each of the k streams to encode the data. Before transmission, the data may be interleaved and pre-coded by an interleaver and a pre-coder (not shown). The purpose of interleaving and pre-coding is to render the data more robust against errors. Both of these techniques are well-known in the art of communication systems.

The transmission rate or throughput of the data varies depending on the modulation, coding rates and transmission scheme (diversity or spatial multiplexing) used in each of the k data streams.

TABLE 1

| Mode | Modulation Rate (bits/symbol) | Coding Rate | Transmission Scheme | Throughput (bits/s/Hz) |
| --- | --- | --- | --- | --- |
| 1 | 2 | 3/4 | Diversity | 3/2 |
| 2 | 2 | 2/3 | Diversity | 4/3 |
| 3 | 2 | 1/2 | Diversity | 1 |
| 4 | 2 | 1/3 | Diversity | 2/3 |
| 5 | 4 | 3/4 | Diversity | 3 |
| 6 | 4 | 2/3 | Diversity | 8/3 |
| 7 | 4 | 1/2 | Diversity | 2 |
| 8 | 4 | 1/3 | Diversity | 4/3 |
| 9 | 2 | 3/4 | Spatial Mult. | (3/2)*k |
| 10 | 2 | 2/3 | Spatial Mult. | (4/3)*k |
| 11 | 2 | 1/2 | Spatial Mult. | 1 *k |
| 12 | 2 | 1/3 | Spatial Mult. | (2/3)*k |
| 13 | 4 | 3/4 | Spatial Mult. | 3*k |
| 14 | 4 | 2/3 | Spatial Mult. | (8/3)*k |
| 15 | 4 | 1/2 | Spatial Mult. | 2*k |
| 16 | 4 | 1/3 | Spatial Mult. | (4/3)*k |

Table 1 illustrates some typical modes with their modulation rates, coding rates and transmission scheme (diversity or spatial multiplexing) and the corresponding throughputs for the data. The modes are indexed by a mode number so as to conveniently identify the modulation, coding rates and transmission scheme (diversity or spatial multiplexing) which are to be applied to the data in each mode. Tables analogous to Table 1 for other coding and modulation rates can be easily derived as these techniques are well-known in the art of communication systems.

Referring back to FIG. 2, a set of modes, conveniently arranged in the form of a table indexed as described above, are stored in a database 290 of the transmit unit 200. The database 290 is connected to a controller 240, which is also connected to the transmit processing block 210, and a spatial mapping unit 220. The controller 240 controls which mode from the database 290 is applied to each of the k streams, and the controller 240 controls spatial mapping to be performed by spatial mapping unit 220. The controller 240 accomplishes this through a mode selection block 250 as will be described later.

In addition to encoding the k streams, transmit processing block 210 adds training information into training tones and any other control information, as is known in the art. After being processed, the k streams are sent to an up-conversion and RF amplification stage 230 having individual digital-to-analog converters and up-conversion/RF amplification blocks, after passing through the spatial mapping unit 220. The spatial mapping unit 220 maps the k streams to M inputs of the up-conversion and RF amplification stage 230. The M outputs of amplification stage 230 lead to corresponding M transmit antennas T1, T2 . . . TM of an antenna array.

A person skilled in the art will recognize that the number M of transmit antennas T1, T2 . . . TM does not have to be equal to the number of streams k. That is because various spatial mappings can be employed in assigning streams k to transmit antennas T1, T2 . . . TM. In one mapping, a certain transmit antenna, for example transmit antenna T2, transmits one of the k streams. In another mapping, a number of transmit antennas T1, T2 . . . TM transmit the same stream k. In yet another embodiment, the k streams are assigned to M antennas or a subset thereof via the spatial mapping unit 220 and the up-conversion multiplexing (SM) and antenna diversity can be used.

The transmit antennas T1, T2 . . . TM transmit the data in the form of transmit signals TS. The transmit signals TS can include a multi-carrier transmission scheme with n frequency carriers (tones). As is well known in multi-carrier systems, training is performed on all tones during an OFDM training symbol. It will be clear to a person skilled in the art that a subset of these tones could be used for training and the corresponding frequency response could be computed at the receiver by interpolating.

The transmit signals TS propagate through a transmission channel between the transmit unit 200 and the receive unit 300, and therefore, experience the effects of changing conditions of the channel, as described above. Transmit signals TS are received in the form of receive signals RS by a receive antenna RN belonging to an array of antennas R1, R2 . . . RN of a receive unit 300, shown in FIG. 3.

Again referring to FIG. 3, the receive unit 300 has N receive antennas R1, R2 . . . RN for receiving receive signals RS from the transmit unit 200. The receive unit 300 can be any suitable receiver capable of receiving receive signals RS via the N receive antennas R1, R2 . . . RN. Exemplary receivers include linear equalizer receivers, decision feedback equalizer receivers, successive cancellation receivers and maximum likelihood receivers.

The receive unit 300 has an RF amplification and down-conversion stage 310 having individual RF amplification/down-conversion and analog-to-digital converter blocks associated with each of the N receive antennas R1, R2 . . . RN. The N outputs of RF amplification and down-conversion stage 310 are connected to a receive processing block 320 that performs receive processing to recover the k streams encoded by transmit processing block 210 of transmit unit 200. The recovered k streams are passed on to a signal detection, decoding and demultiplexing block 330 for recovering data. In the case of antenna diversity processing it should be understood that k is equal to one and thus there is only a single stream recovered.

The receive processing block 320 generally computes the quality parameters for each of the k streams and sends this information to a statistics computation block for computing statistical parameters of the one or more quality parameters. As will be described, this generally includes computing first quality parameters for each of the k streams, and then a second quality parameter for each base station (the number of base stations is designated as B in FIG. 3) transmitting to the receive unit. Multiple base stations transmitting to a single receiver is characteristic of multiple base spatial multiplexing as will be described later. The method of the invention can recognize slow and rapid channel variations and allows for efficient mode selection by taking both types of variation into account. This is accomplished by taking into account statistics of two or more quality parameters.

Here, the quality parameters have been designated as a first quality parameter and a second quality parameter. The first quality parameter can include signal-to-interference and noise ratio (SINR), signal-to-noise ratio (SNR) and power level. The second quality parameter can include a BER (bit error rate) or a PER (packet error rate) of the received data.

Basically, the first quality parameter is used to generate a first estimate of an optimal transmission mode. The first estimate is determined by referencing a predetermined mode look-up-table (LUT). The LUT provides the first estimate of the optimal transmission mode based upon a desired second quality parameter. The second quality parameter is measured. A correction factor is generated based upon a difference between the measured second quality parameter and the desired or expected second quality parameter. The correction factor is used to modify the optimal transmission mode estimate.

FIG. 4 shows a couple of examples of predetermined mode look-up-tables (LUTs). The LUTs provide an estimated transmission mode estimate based upon a comparison of a measured first quality parameter and thresholds within the look-up-tables. For the tables shown in FIG. 4, the first quality parameter can include an SNR measurement of the received signals. Methods for determining the SNR of a received signal are well known in the art of communication systems.

A first LUT 420 includes estimated transmission modes for an expected or target BER of X. That is, for various measured values SNR of the received signals, the LUT 420 provides estimated transmission modes in order to maintain a BER of X. For example, if the measured SNR is less than 5 dB, then the first LUT 420 suggests a transmission mode of 1. If the measured SNR is greater than 5 dB, but less than 7.5 dB, then the LUT 420 suggests a transmission mode of 2. The rest of the transmission modes are suggested in a corresponding manner.

A second LUT 430 includes estimated transmission modes for an expected or target BER of Y. That is, for various measured values SNR of the received signals, the LUT 420 provides estimated transmission modes in order to maintain a BER of Y. For example, if the measured SNR is less than 3 dB, then the second LUT 430 suggests a transmission mode of 1. If the measured SNR is greater than 3 dB, but less than 5.5 dB, then the LUT 420 suggests a transmission mode of 2. The rest of the transmission modes are suggested in a corresponding manner.

For the above-described LUTs 420, 430, the lower the transmission mode number, the lower the data rate of the data being transmitted. That is, generally a lower mode includes a lower order modulation. A lower mode is more robust, and therefore, more optimal for use with lower SNR transmission.

Various factors can influence the LUT selection. For example, high level of quality of service can require the target BER to be lower. Additionally, different transmission channels will generally require different LUTs in order to maintain a target BER. This is particularly important for spatial multiplexing system. More particularly, for multiple base station spatial multiplexing, where the transmission channels between a receiver and different base transceiver stations can be very different.

Generally, each LUT is generated based upon simulations or characterizations of the transmission channels. Therefore, the LUTs are generated based upon a particular channel model, or a channel at a particular point in time. It should be understood that there can be mismatches between the simulated and the real propagation conditions. Without corrections, the estimated transmission modes can lead to data transmissions having BERs that are different than the target BER. The LUTs do not capture the lack of channel coherence between the time period a mode is selected and the time period the mode selection is used by a transmitter.

Referring back to FIG. 2 and FIG. 3, both of these figures include a corresponding LUT 270, 370. In FIG. 2, the mode selection is made at the transmit unit 200. In FIG. 3, the mode selection is made at the receive unit 300.

An embodiment of the transmit unit 200 of FIG. 2 includes a mode selection block 250. The mode selection block generates a first mode selection based upon a first quality parameter fed back from the receiver unit. The first quality parameter can be based upon signals transmitted in an initial mode. The initial mode can be randomly selected, or preset to a selected initial mode. An embodiment includes the first quality parameter being an SNR measurement made at the receiver unit. As previously described, other quality parameters besides the SNR can be used. Generally, the initial mode selection is made by referencing the LUT 270. The first mode selection is made based upon the first quality parameter, where the mode selection is made by referencing the LUT with the first quality parameter.

After setting the transmission mode of the transmitter unit 200 based upon the initial transmission mode selection, a second quality parameter is measured. An embodiment include the second quality parameter being the PER. Both the first quality parameter and the second quality parameter are fed back to the transmit unit 200. The transmit unit 200 receives feedback from receive unit 300 via a feedback extractor 260.

A first scenario includes a correction factor being generated by an error factor computation unit 280. Essentially, the error factor computation unit 280 generates the error factor by determining a difference between the measured second quality parameter and an expected second quality parameter. That is, the LUT 270 is a pre-generated table based upon an expected, desired or predicted second quality parameter. If the second quality parameter is PER, then the correction factor is a generated value that depicts the difference between the measured PER and the PER predicted by the LUT 270.

A second scenario includes the feedback extractor 260 detecting the mode index or any other designation of the selected modes for each of the k streams and forwarding this information to the controller 240. The controller 240 looks up the mode by mode index in the database 290, and thus determines the modulation, coding rate and any other parameters to be used for each of the k streams.

In the event of using time-division duplexing (TDD), which is a technique known in the art, the quality parameters can be extracted during the reverse transmission from receive unit 300 or remote subscriber unit and no dedicated feedback is required.

In FIG. 2, the error factor computation unit 280 includes dashed lines connected to the mode selection unit 250 and the LUT 270. The dashed lines indicate two possible configuration of the invention. It is to be understood that these configurations are merely examples of how the invention can be implemented.

A first configuration includes the error factor computation unit 280 being connected to the mode selection unit 250. As previously described, the mode selection unit 250 references the LUT 270 with the first quality parameter and generates a transmission mode selection. This configuration includes the correction factor generated by the error factor computation unit 280 being summed with the first quality parameter to modify the resulting transmission mode selection. As will be described, the correction factor can be a negative or a positive number depending upon whether the most recent data packet was correctly or incorrectly received.

A second configuration includes the error factor computation unit 280 being connected to the LUT 270. As previously described, the mode selection unit 250 references the LUT 270 with the first quality parameter and generates a transmission mode selection. This configuration includes the correction factor generated by the error factor computation unit 280 being summed with the thresholds within the LUT 270 to modify the resulting transmission mode selection. As will be described, the correction factor can be a negative or a positive number depending upon whether the most recent data packet was correctly or incorrectly received.

In FIG. 3, the error factor computation unit 380 includes dashed lines connected to first quality parameter unit 340 and the LUT 370. The dashed lines indicate two possible configuration of the invention. It is to be understood that these configurations are merely examples of how the invention can be implemented.

A first configuration includes the error factor computation unit 380 being connected to the first quality parameter unit 340. As previously described, the mode selection unit 360 references the LUT 370 with the first quality parameter and generates a transmission mode selection. This configuration includes the correction factor generated by the error factor computation unit 380 being summed with the first quality parameter to modify the resulting transmission mode selection. As will be described, the correction factor can be a negative or a positive number depending upon whether the most recent data packet was correctly or incorrectly received.

A second configuration includes the error factor computation unit 380 being connected to the LUT 370. As previously described, the mode selection unit 360 references the LUT 370 with the first quality parameter and generates a transmission mode selection. This configuration includes the correction factor generated by the error factor computation unit 380 being summed with the thresholds within the LUT 370 to modify the resulting transmission mode selection. As will be described, the correction factor can be a negative or a positive number depending upon whether the most recent data packet was correctly or incorrectly received.

The mode selection unit 360 selects the subsequent mode number for encoding the transmitted data. The mode selection unit 360 is connected to a feedback block 390 and a corresponding transmitter 395 for transmission of the feedback to transmit unit 200. Here the convenience of indexing modes becomes clear, since feedback of an index number to the transmit unit 200 does not require much bandwidth. It should be noted, that in the present embodiment a mode selection is made for each of the k streams. In other words, a mode index indicating the mode to be used for each of the k streams is fed back to the transmit unit 200. In another embodiment, it may be appropriate to send a mode difference indicating how to modify the current mode for subsequent transmission. For example, if the current transmission is mode 1, and the mode index of the subsequent mode is 3, the mode difference would be 2. In yet another embodiment, it may be suitable to send the channel characteristics back to the transmit unit 200. In this case the computation of statistics of the quality parameters and the mode selection are performed at the transmit unit 200.

The correction factor generated by error factor computation unit 380 provides continuous correction or optimization of the transmission mode selection. The rate at which the correction factor is generated (for example, for each received data packet) is substantially faster than the first quality parameter is updated. Each data packet, whether the data packet is received in error or not, determines whether the correction factor is assigned a negative or a positive value, and increments or decrements the first quality parameter or the thresholds within a LUT. Data packets received in error generally cause the error correction to be positive, while data packets received without error cause the error correction to be negative.

An embodiment includes a positive error correction being assigned a value of X, and a negative correction being assigned a value of X/N. It can be determined through simulation and analytically that at convergence, the value of N is directly related to the target PER. Simulation suggests that;

$N = (1/(PER_{target})) - 1.$

For example, at convergence, if the target PER is 5%, then N=19.

The correction factor is used to continuously correct the first quality parameter or the thresholds within the LUTs. Therefore, the PER is continuously monitored to remain close to the target PER.

At initialization, the correction factor is set to zero. Then upon reception of each data packet, a positive or negative correction factor is generated.

Another embodiment includes the error factor being generated once per a predetermined amount of time. The error factor can be set to a first value if an average PER is greater than an upper bound threshold, and the error factor can set to a second value if the average PER is less than an lower bound threshold.

Figure 5:
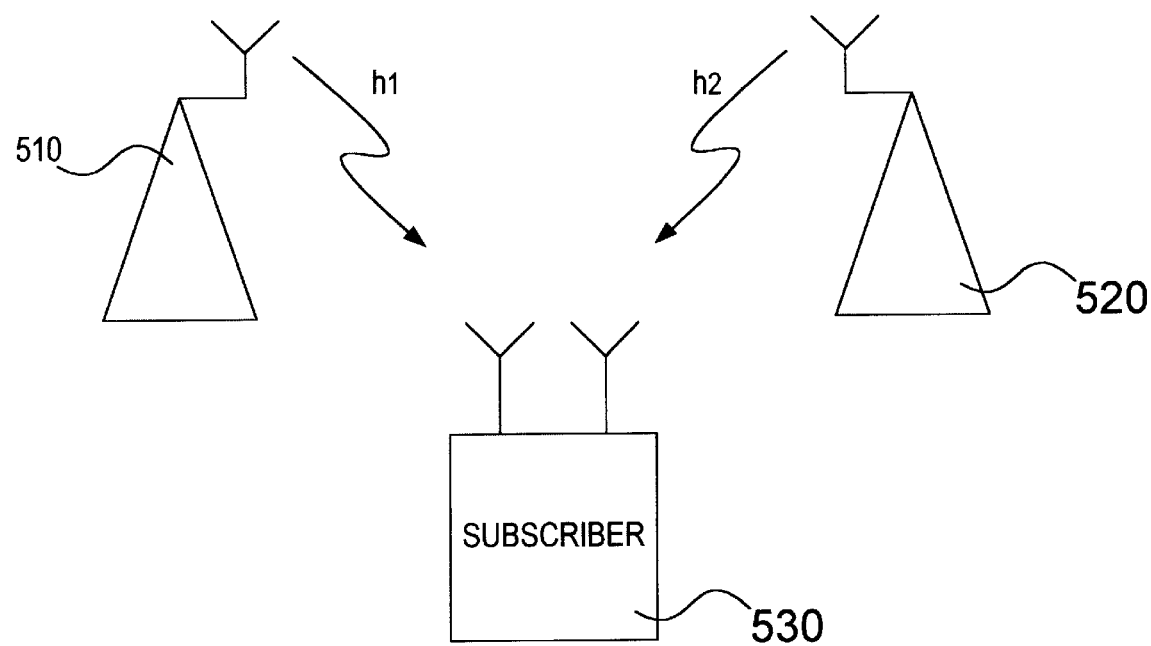
FIG. 5 shows a MIMO system that includes an embodiment of the invention.

FIG. 5 shows a multiple base station spatial multiplexing system. A first base transceiver station 510 transmits data to a subscriber 530. A second base transceiver station 520 also transmits data to the subscriber 530. As shown in FIG. 5, data transmitted to the subscriber 520 from the first base transceiver station 510 travels through a first channel h1. Data transmitted to the subscriber 530 from the second base transceiver station 520 travels through a second channel h2.

The antennas of the multiple base stations 510, 520 can be used for spatial multiplexing data transmission to the subscriber 530. Due to the physical separation of the multiple base stations 510, 520, the first channel h1 and the second channel h2 can be very different. Therefore, a LUT is generally generated for the first channel h1 that is different than a LUT generated for the second channel h2. The above-described embodiments of the invention can be extended to include the multiple base spatial multiplexing configuration of FIG. 5 in which a separate LUT is developed for each of the separate transmission channels. Clearly, more than two base transceiver stations can be used. In addition, each of the base transceiver stations of FIG. 5 can include multiple antennas.

Figure 6:
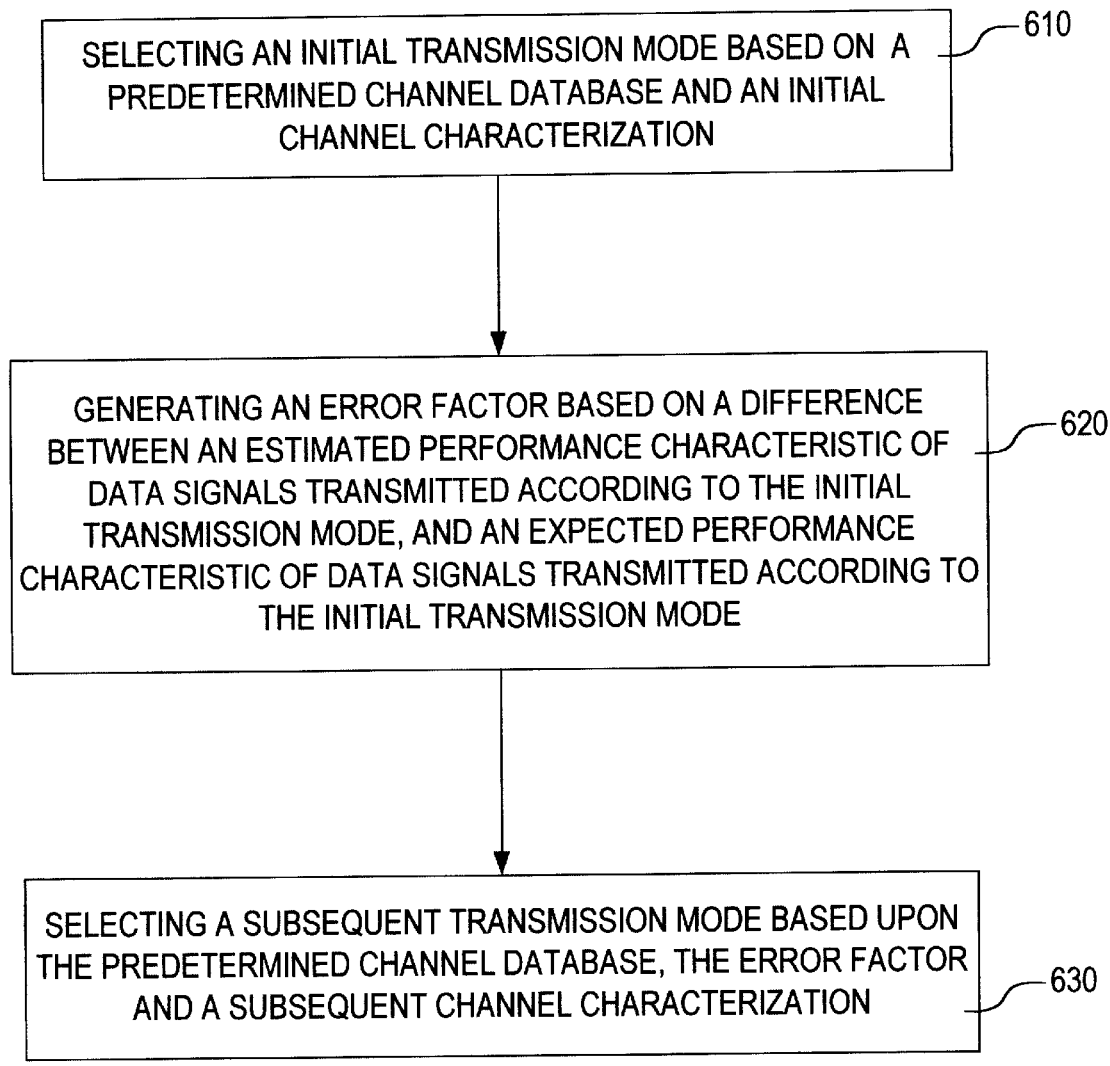
FIG. 6 is a flow chart of steps included within an embodiment of the invention.

FIG. 6 is a flow chart that includes steps of an embodiment of the invention.

A first step 610 includes selecting an initial transmission mode based on a predetermined channel database and an initial channel characterization.

A second step 620 includes generating an error factor based on a difference between an estimated performance characteristic of data signals transmitted according to the initial transmission mode, and an expected performance characteristic of data signals transmitted according to the initial transmission mode A third step 630 includes selecting a subsequent transmission mode based upon the predetermined channel database, the error factor and a subsequent channel characterization.

Figure 7:
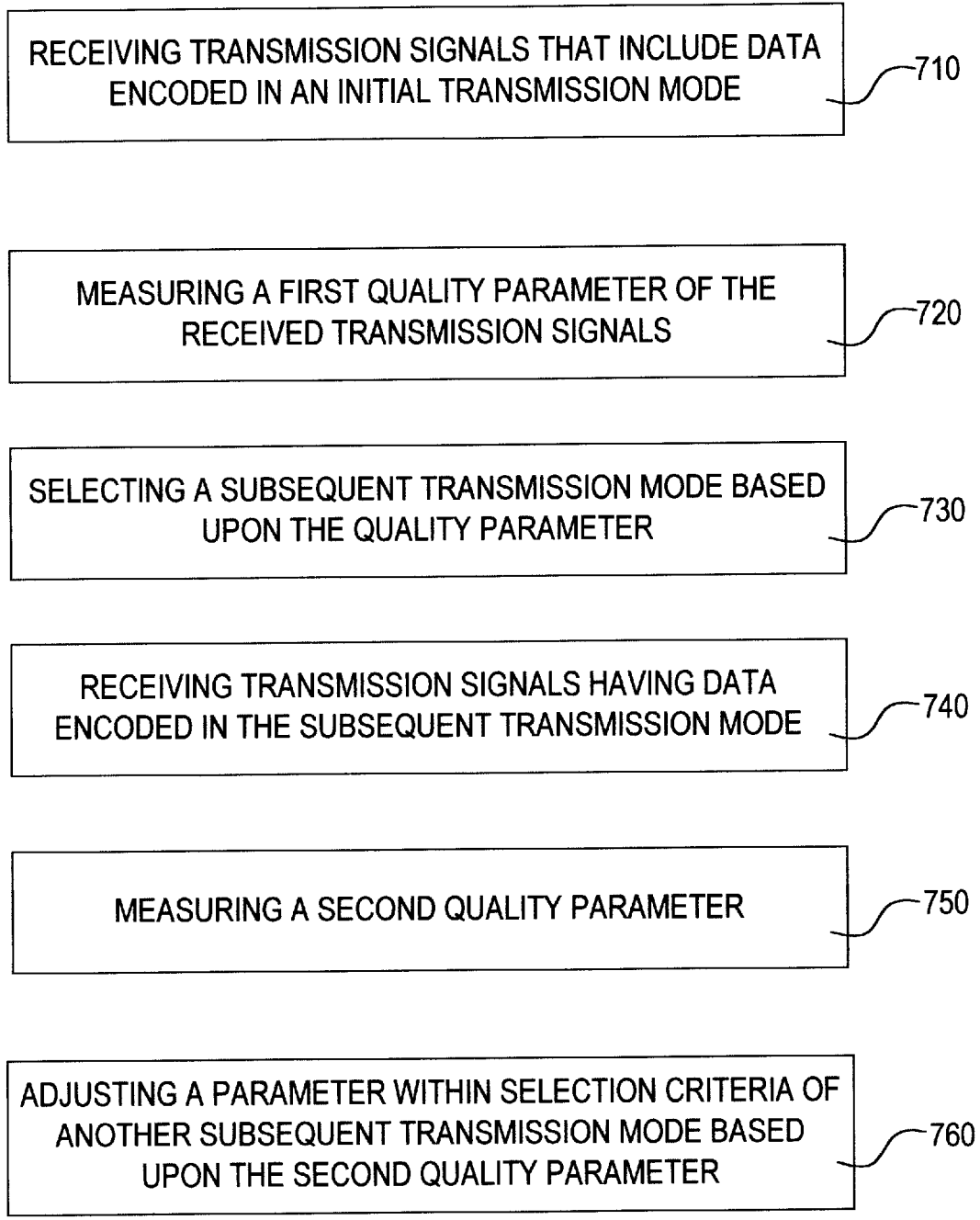
FIG. 7 is a flow chart of steps included within another embodiment of the invention.

FIG. 7 is a flow chart that includes steps of another embodiment of the invention.

A first step 710 includes receiving transmission signals that include data encoded in an initial transmission mode.

A second step 720 includes measuring a first quality parameter of the received transmission signals.

A third step 730 includes selecting a subsequent transmission mode based upon the quality parameter.

A fourth step 740 includes receiving transmission signals having data encoded in the sub sequent transmission mode.

A fifth step 750 includes measuring a second quality parameter.

A sixth step 760 includes adjusting a parameter within selection criteria of another subsequent transmission mode based upon the second quality parameter.

Although specific embodiments of the invention have been described and illustrated, the invention is not to be limited to the specific forms or arrangements of parts so described and illustrated. The invention is limited only by the claims.

What is claimed:

1. A method of optimizing a transmission mode of wirelessly transmitted data, the method comprising:

selecting a first transmission mode based on a predetermined channel database and a first channel characterization;

generating an error factor based on a difference between an estimated performance characteristic of data signals transmitted according to the first transmission mode, and an expected performance characteristic of data signals transmitted according to the first transmission mode; and selecting a subsequent transmission mode based upon the predetermined channel database, the error factor and a subsequent channel characterization.

2. The method of optimizing a transmission mode of wirelessly transmitted data of claim 1, wherein the first channel characterization is based upon signals transmitted in an initial mode.

3. The method of optimizing a transmission mode of wirelessly transmitted data of claim 1, wherein the predetermined channel database comprises a predetermined lookup-table that provides a transmission mode selection based upon a channel characterization.

4. The method of optimizing a transmission mode of wirelessly transmitted data of claim 3, wherein the look-up-table comprises a plurality of quality parameter thresholds that determine the selection of a transmission mode.

5. The method of optimizing a transmission mode of wirelessly transmitted data of claim 4, wherein selecting a subsequent transmission mode based upon the predetermined channel database, the error factor, and a subsequent channel characterization comprises:

adjusting the quality parameter thresholds within the predetermined look-up-table with the error factor; and selecting the subsequent transmission mode based upon the adjusted look-up-table and the subsequent channel characterization.

6. The method of optimizing a transmission mode of wirelessly transmitted data of claim 1, wherein the error factor is generated once for every received data packet.

7. The method of optimizing a transmission mode of wirelessly transmitted data of claim 6, wherein the error factor is set to a first value if a data packet is properly received, and the error factor is set to a second value f the data packet is improperly received.

8. The method of optimizing a transmission mode of wirelessly transmitted data of claim 6, wherein the quality parameter thresholds within the predetermined look-up-table are adjusted by the error factor after the reception of each data packet.

9. The method of optimizing a transmission mode of wirelessly transmitted data of claim 1, wherein the error factor is generated once per a predetermined amount of time.

10. The method of optimizing a transmission mode of wirelessly transmitted data of claim 9, wherein the error factor is set to a first value if an average packet error rate is greater than an upper bound threshold, and the error factor is set to a second value if the average packet error rate is less than an lower bound threshold.

11. The method of optimizing a transmission mode of wirelessly transmitted data of claim 3, wherein the selecting a subsequent transmission mode based upon the predetermined channel database, the error factor and a subsequent channel characterization comprises:

adjusting the subsequent channel characterization with the error factor; x and selecting the subsequent transmission mode based upon the look-up-table and the adjusted subsequent channel characterization.

12. The method of optimizing a transmission mode of wirelessly transmitted data of claim 1, further comprising:

individually selecting a first transmission mode based on a predetermined channel database and a first channel characterization for each of a plurality of transmission streams, each of the plurality of transmission streams being received by the same receiver, allowing spatial multiplexing;

generating an error factor based on a difference between an estimated performance characteristic, and an expected performance characteristic, for the plurality of transmission streams; and selecting a subsequent transmission mode based upon the predetermined channel database, the error factor and a subsequent channel characterization, for the transmission streams.

13. The method of optimizing a transmission mode of wirelessly transmitted data of claim 12, wherein the transmission streams are transmitted from a plurality of base stations.

14. The method of optimizing a transmission mode of wirelessly transmitted data of claim 13, wherein an error factor is selected for each base station.

15. The method of optimizing a transmission mode of wirelessly transmitted data of claim 13, wherein, a subsequent transmission mode is selected for each of the transmission streams.

16. A method of optimizing a transmission mode of wirelessly transmitted data, the method comprising:

receiving transmission signals that include data encoded in an initial transmission mode;

measuring a first quality parameter of the received transmission signals;

selecting a subsequent transmission mode based upon the quality parameter;

receiving transmission signals having data encoded in the subsequent transmission mode;

measuring a second quality parameter; and adjusting a parameter within selection criteria of another subsequent transmission mode based upon the second quality parameter.

17. The method of optimizing a transmission mode of wirelessly transmitted data of claim 16, wherein selecting a subsequent transmission mode based upon the quality parameter comprises referencing a predetermined look-up-table that provides a subsequent transmission mode selection based upon the first quality parameter.

18. The method of optimizing a transmission mode of wirelessly transmitted data of claim 17, wherein the look-up-table comprises a plurality of quality parameter thresholds that determine the selection of a subsequent transmission mode.

19. The method of optimizing a transmission mode of wirelessly transmitted data of claim 18, wherein adjusting a parameter within a selection criteria of the subsequent transmission mode based upon the second quality parameter comprises:

adjusting the quality parameter thresholds within the predetermined look-up-table.

20. The method of optimizing a transmission mode of wirelessly transmitted data of claim 18, wherein the second quality parameter is obtained once for every received data packet.

21. The method of optimizing a transmission mode of wirelessly transmitted data of claim 20, wherein obtaining the second quality parameter comprises incrementing a table correction factor by a first value if a data packet is properly received, and incrementing the table correction factor by a second value if the data packet is improperly received.

22. The method of optimizing a transmission mode of wirelessly transmitted data of claim 21, wherein the quality parameter thresholds within the predetermined look-up-table are adjusted by the table correction factor after the reception of each data packet.

23. The method of optimizing a transmission mode of wirelessly transmitted data of claim 21, wherein a magnitude of the first value and a magnitude of a second value are dependent upon a convergence time.

24. The method of optimizing a transmission mode of wirelessly transmitted data of claim 16, wherein a subsequent transmission mode based upon the quality parameter is periodically selected.

25. The method of optimizing a transmission mode of wirelessly transmitted data of claim 16, wherein adjusting a parameter within a selection criteria of the subsequent transmission mode based upon the second quality parameter comprises:

adjusting a value of the first quality parameter before referencing the predetermined look-up-table.

26. A method of optimizing a transmission mode of wirelessly transmitted data, the method comprising:

receiving a data signal from a transmitter, data of the data signal arranged according to a first transmission mode based on a predetermined channel database and a first channel characterization;

generating an error factor based on a difference between an estimated performance characteristic of the received data signal, and an expected performance characteristic of the received data signal; and aiding in selection of a subsequent transmission mode based upon the predetermined channel database, the error factor and a subsequent channel characterization.

27. A method of optimizing a transmission mode of wirelessly transmitted data, the method comprising:

transmitting a data signal from a transmitter, data of the data signal arranged according to an initial transmission mode based on a predetermined channel database and an initial channel characterization;

the transmitter receiving an error factor based on a difference between an estimated performance characteristic of the transmitted data signal, and an expected performance characteristic of the transmitted data signal; and selecting a subsequent transmission mode based upon the predetermined channel database, the error factor and a subsequent channel characterization.

28. A method for dynamically adjusting a transmission mode, the method comprising:

generating an error factor associated with the difference between an estimated performance characteristic of data signals transmitted according to a first transmission mode, and an expected performance characteristic of data signals transmitted according to the first transmission mode; and selecting a subsequent transmission mode based, at least in part, on a channel database and the generated error factor.

29. A method according to claim 28, wherein the channel database comprises a lookup table that provides a number of transmission modes indexed, at least in part, by channel characterization.

30. A method according to claim 28, the element of selecting a subsequent transmission mode comprising:

adjusting one or more quality parameter thresholds in the lookup table based, at least in part, on the generated error factor; and selecting the subsequent transmission mode based upon the adjusted lookup table and subsequent channel characterization.

31. A receiver comprising:

a storage medium to store executable content; and control logic, coupled with the storage medium to selectively execute at least a subset of the executable content to generate an error factor associated with the difference between an estimated performance characteristic of data signals transmitted according to a first transmission mode, and an expected performance characteristic of data signals transmitted according to the first transmission mode, and to select a subsequent transmission mode based, at least in part, on a channel database and the generated error factor.

32. A transmitter comprising:

a controller, to apply a select transmission mode to a wireless transmission of information; and a mode selection unit, coupled to the controller, to receive an indication of an error factor based, at least in part, on a difference between an estimated performance characteristic of data signals transmitted according to a prior transmission mode, and an expected performance characteristic of data signals transmitted according to the prior transmission mode, and to select a subsequent transmission mode based upon the predetermined channel database, the error factor and a subsequent channel characterization.

33. A transmitter according to claim 32, further comprising:

a transmit processing unit, coupled to the controller, to receive the select transmission mode and apply it to received information for wireless transmission.

34. A transmitter according to claim 33, further comprising:

a spatial mapping element, coupled to the controller, to receive the select transmission mode and selectively apply a spatial processing to information received from the transmit processing unit.

35. A transmitter according to claim 34, further comprising:

a radio frequency (RF) amplification stage, coupled with the spatial mapping unit, to receive information processed with the select transmission mode and generate a wireless transmission signal for transmission via one or more antenna(e).

36. A transmitter according to claim 32, wherein the transmission mode is comprised of one or more of a modulation rate, a coding rate, and a spatial transmission mode.

37. A transmitter according to claim 32, wherein the indication of an error factor is received from a remote receiver.

38. A transmitter according to claim 32, wherein the indication of an error factor is received from a receiver co-located with the transmitter.

39. A wireless communication device comprising:

one or more omnidirectional antenna(e); and a transmitter, selectively coupled with at least a subset of the one or more omnidirectional antennae, to generate a wireless transmission signal, the transmitter including a controller, to apply a select transmission mode to a wireless transmission of information, and a mode selection unit, coupled to the controller, to receive an indication of an error factor based, at least in part, on a difference between an estimated performance characteristic of data signals transmitted according to a prior transmission mode, and an expected performance characteristic of data signals transmitted according to the prior transmission mode, and to select a subsequent transmission mode based upon the predetermined channel database, the error factor and a subsequent channel characterization.

* * * * *